Feb. 6, 1962 E. L. BENNET 3,019,808
STOPCOCK
Filed March 17, 1960

INVENTOR.
Eugene L. Bennet
BY
Wupper, Gradolph & Love
Attys.

United States Patent Office
3,019,808
Patented Feb. 6, 1962

3,019,808
STOPCOCK
Eugene L. Bennet, St. Joseph, Mich., assignor to Laboratory Equipment Corporation, St. Joseph, Mich., a corporation of Michigan
Filed Mar. 17, 1960, Ser. No. 15,768
6 Claims. (Cl. 137—246)

This invention relates generally to laboratory equipment, and more especially to a stopcock which is particularly useful for introducing certain types of materials into a closed system.

Ordinary glass stopcocks of the tapered plug, ground joint type require lubrication, a special stopcock grease usually being provided for this purpose. Operation of such a stopcock thus soon results in grease being smeared into the openings at the contiguous ends of the inlet and outlet passages and into the ends of the passage through the rotatable plug. Objects or materials passing through the open stopcock are therefore subject to contamination by the grease, and this, under some conditions, is a great deterrent to precise work.

It is a principal object of this invention to provide a novel stopcock which may be used over extended periods without danger of the stopcock grease contaminating materials passed through the stopcock.

An additional object is to provide a stopcock with novel means for preventing stopcock grease from getting into the passages through the stopcock.

Another object is to accomplish the above at low cost and with a minimum of complexity.

In some types of laboratory apparatus it is necessary to drop a small object, such as a sample of metal to be chemically analyzed, into a closed system of some sort. This may be accomplished, for instance, by putting the sample into a sealed chamber, opening a stopcock below the sealed chamber, dropping the sample through the opened stopcock into the closed system, closing the stopcock, and then reloading the sealed chamber with another sample, and so on. Regardless of the specific nature of such apparatus—and considerable variation is met in practice—a stopcock is usually present somewhere in the system to pass the sample to be tested from one chamber to another. Since stopcocks must be greased, there is always present the danger that some of this grease will get into the bore of the stopcock and adhere to the sample passing through. Under these conditions, the sample will no longer be clean, and the analysis will be faulty.

When a stopcock incorporating the features of this invention is used, the bore through the stopcock plug and the inlet and outlet passages in the body portion adjacent the plug will remain free of grease for long periods even though use of the apparatus requires that the stopcock plug be turned many times between open and closed positions.

Figure 1:
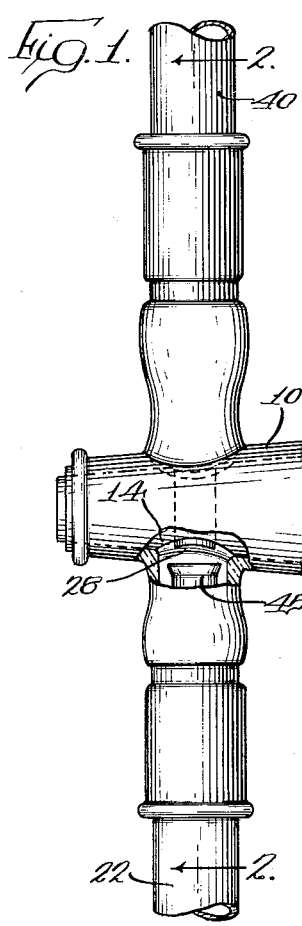
FIG. 1 is a side view of a stopcock incorporating features of the present invention.
Figure 2:
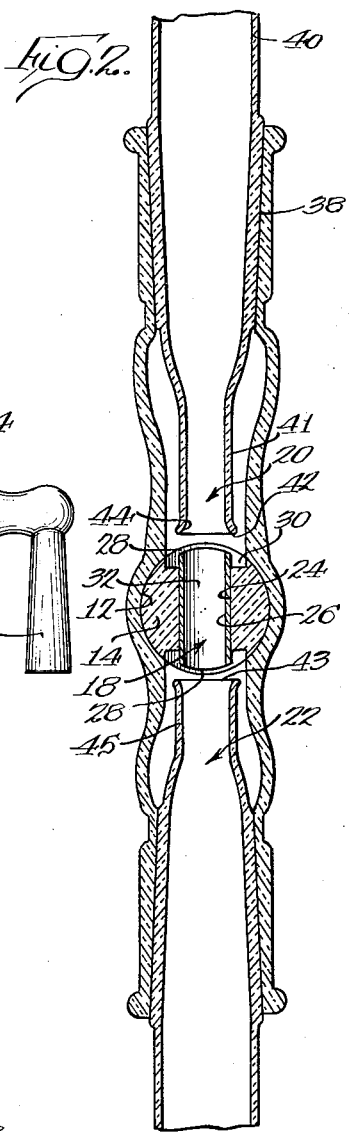
FIG. 2 is a longitudinal medial sectional view which may be considered as taken in the direction of the arrows substantially along the line 2—2 of FIG. 1, showing the stopcock in open position.
Figure 3:
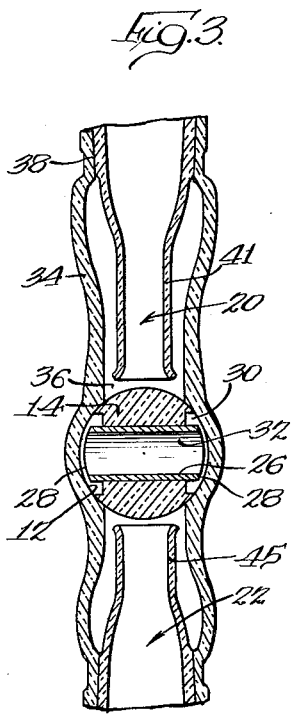
FIG. 3 is essentially similar to the major portion of FIG. 2, but shows the stopcock in closed position.

Inspection of FIGS. 1, 2 and 3 will show that the stopcock has a generally conventional appearance in that there is a body portion 10 having a socket 12 to receive a tapered plug 14 provided at one end with a handle 16. The plug and socket are ground together to form a comparatively tight joint and, in use, the interfitting surfaces are sealed and lubricated by a heavy stopcock grease. At about the center of the body portion, the plug 14 has a transverse bore or passage 18 which, when the stopcock is opened, is turned so as to be in alignment with aligned inlet and outlet passages 20 and 22 respectively. In this position, the bore 18 acts as a continuation of the passages 20 and 22. The stopcock is closed by rotating the plug approximately to the position shown in FIG. 3 such that the bore 18 axis is at about 90° to the axis of the inlet and outlet passages 20 and 22.

In the embodiment of the invention illustrated in FIGS. 1 to 3 the plug bore indicated generally by the numeral 18 is formed by drilling a hole 24 through the plug such that this hole is slightly larger in diameter than the final desired bore dimension. Both ends of this hole 24 are also counterbored to a somewhat larger diameter, the depth of the counterbore being rather shallow, but nevertheless deep enough so that the bottom of the counterbore is well below the conical surface of the plug. A short piece of thin walled metal tubing 26 is then pressed into the hole 24 with its ends 28 protruding almost but not quite to the plug conical surface as is well shown in FIGS. 2 and 3. The result of this is to form an annular groove 30 completely around the passage 32 through the tube, this passage serving as the bore of the stopcock plug.

The inlet and outlet connections to the body portion 10 may be substantial duplicates of each other and only the inlet connection needs full description. As shown, the body portion 10 has an upward radial extension 34 with an internal passage 36. This passage 36 has a diameter where it joins the surface of the socket 12 about equivalent to the diameter of the counterbore portion of the plug 14. This passage dimension is not critical, it being important merely that it have a diameter substantially larger than the desired diameter for the inlet passage through which the objects are to pass when the stopcock is open.

The outer end of the extension 34 has a ground, tapered socket fitted to a complementary surface 38 upon the outside of an inlet tube 40, this inlet tube extending downwardly and being drawn inwardly so that near its inner end 42 it has a diameter, as at 41, which is slightly smaller than the passage 32 through the metal tube 26. Preferably the extreme inner end 42 of the inlet tube is flared slightly as shown at 44, and fire polished. Note that the axis of the inlet tube end is aligned with the axis of the metal tube 26 when the stopcock is in open position and that the end 42 of the inlet tube does not reach quite to the ground surface 12 of the plug socket.

When the stopcock is open, objects dropped through the inlet tube 40 will be guided inwardly toward the axis as they fall and thus will be aligned to drop freely through the plug passage 32 and into the adjacent end of the exit passage 22 which is a substantial duplicate of the inlet passage, excepting that its inlet or upper end 43 is preferably slightly larger than the plug passage 32. Also, the small diameter portion 45 may be shorter than the similar portion 41 of the inlet fitting, since the portion 45 serves no centering function upon dropped objects. Since the smallest diameter of the inlet passage is slightly smaller than the passage 32 through the plug, there will be no danger of the dropped object not falling freely into the plug passage. As the object falls from plug passage 32, even if it is against the side wall, it will fall freely through the slightly larger outlet passage portion 45 and drop into whatever apparatus is to receive it.

As the stopcock plug is rotated repeatedly between open and closed positions, grease will gradually be scraped off into the annular grooves 30 in the plug 14 and into the spaces at the inner ends of the extensions 34. None of this grease contaminates either the inlet or outlet passages or the passage 32 through the plug, however, until such a quantity has been caught in the annular grooves 30 that it overflows the ends of the metal tube 26. Usually by this time it is necessary to remove the plug and clear and regrease it in any event.

Since stopcocks are conventionally made of glass, and since it is desirable not to subject this material to much stress, I prefer to make the tube 26 of a relatively soft metal. For this purpose I have found aluminum to be entirely satisfactory. Of course the tube 26 could be formed of any desired material and could be cemented into place if necessary, but I have found the procedure outlined above to be about as simple as any.

Figure 4:
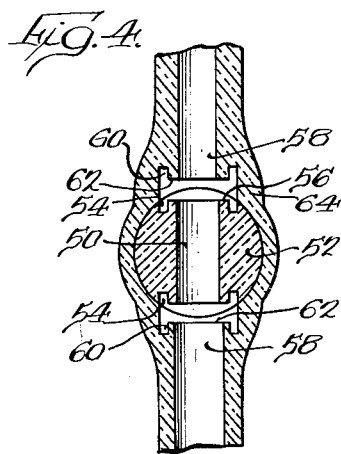
FIG. 4 is a view generally similar to FIG. 2, but illustrates the features of the invention incorporated in an alternative structure.

The stopcock illustrated in FIG. 4 is essentially similar to the one described above excepting that the bore 50 through the plug 52 is drilled to the final desired size and annular grooves 54, having an inside diameter larger than the bore diameter, are cut around this bore at each end to serve the same purpose as the grooves 30. The glass sections at the ends of the bore, inside the grooves 54, are ground down slightly so that, as with the ends of the tube 26, they are below the conical surface of the plug as is indicated at 56. The inner ends of the inlet and outlet passages 58 are also shaped similarly so as to form grease catching grooves 60 with the inner ends 62 of these passages recessed slightly below the conical surface in the body portion 64.

Figure 5:
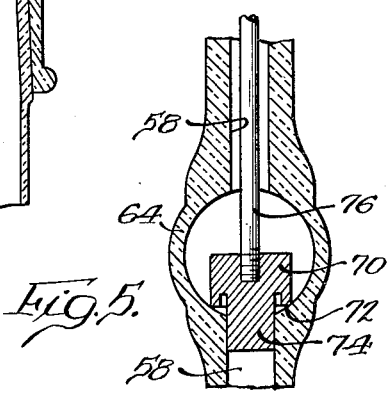
FIG. 5 is a longitudinal sectional view which illustrates a manufacturing step useful in providing the device of FIG. 4.

The operation of forming the inner ends of the inlet and outlet passages is conducted in somewhat restricted quarters, but I have found that it can be accomplished without difficulty by using the scheme illustrated in FIG. 5. Here a special drilling device 70 is provided. It has a pilot portion 74 which loosely fits the passage 58 and a head shaped to provide an annular ridge 72 for cutting the groove 60. This device is placed in position through the transversely extending socket and connected, as by a screw thread, to a drilling stem 76 which extends outwardly through the opposite passage 58. The stem is rotated by a drill press, and carborundum granules in turpentine are supplied as the abrasive. A low cost tool such as this will quickly and easily shape the glass at the ends of the inlet and outlet passages without difficulty.

As with the first example, the inlet passage may be slightly smaller than the plug passage which in turn may be slightly smaller than the outlet passage. Usually, however, no difficulty will be experienced, particularly in the smaller stopcock sizes, if all of the passages through the stopcock are made the same size. The special construction described relating to the relative passage sizes may therefore be considered to be a refinement which is important in some instances, and particularly in the larger sizes where the free fall between the adjacent ends of the passages is greater.

In general, I believe that the construction shown in FIGS. 1 to 3 will be found to be more convenient when making the larger sizes of stopcocks, while the arrangement of FIG. 4 will be more suitable for smaller ones, but this, to some extent at least, is a matter of individual choice.

Although the stopcock of this invention is especially useful in the larger and medium sizes for passing dropped solid objects, it is also of considerable advantage, particularly in the smaller sizes for the control of gases and liquids where the problem of grease contamination of the material passing through is not particularly serious, but where the problem is that the small passages quite readily become restricted or plugged with grease. For this purpose, the simple construction of FIG. 4 is entirely adequate, and of course the relative passage sizes is of little consequence in this application of the invention.

From the above description of a preferred embodiment of my invention, it will be apparent that variations may be made in the structure without departing from the scope or spirit of the invention, and that the scope of the invention is to be determined from the scope of the following claims.

Having described my invention, what I claim as new and useful and desire to secure by Letters Patent is:

1. In a stopcock, a body member providing a tapered socket, a rotatable plug having a tapered surface fitted to said socket, said plug having a transverse passage, said body member having means providing inlet and outlet passages adapted to be connected by said plug passage when said plug is rotated to one position and to be disconnected when said plug is rotated to another position, said plug being formed to provide an annular groove around each of the ends of said plug passage, the portions of said plug at the ends of said plug passage inside said annular grooves being recessed slightly with respect to the tapered surface of said plug, said socket being formed to provide annular spaces around the contiguous ends of said inlet and outlet passages, and the means providing the contiguous ends of said inlet and outlet passages inside said annular spaces being recessed slightly with respect to the surface of said socket.

2. In a stopcock, a rotatable plug fitted in a socket formed in a body member, said plug having a transverse passage, the body member having means providing inlet and outlet passages adapted to be connected to the plug passage when the plug is rotated to one position and disconnected when the plug is rotated to another position, and said plug and body member being formed to provide spaces separating the ends of the plug passage from the surface of the socket and the ends of the inlet and outlet passages of the socket from the surface of the plug in all positions of the plug within said socket.

3. In a stopcock, a body member providing a tapered socket, a rotatable plug having a tapered surface fitted to said socket, said plug having a transverse passage, said body member having means providing inlet and outlet passages adapted to be connected by said plug passage when said plug is rotated to one position and to be disconnected when said plug is rotated to another positon, said plug being formed to provide a recess around each of the ends of said plug passage, said recessed portions being spaced outwardly of said passage, the portions of said plug at the ends of said plug passage inside said recessed portions being slightly below the tapered surface of said plug, said socket being formed to provide spaces around the contiguous ends of said inlet and outlet passages, and the means providing the contiguous ends of said inlet and outlet passages being recessed slightly with respect to the surface of said socket.

4. The combination called for in claim 1, wherein the inlet passage is smaller than the plug passage and the plug passage is smaller than the outlet passage.

5. The combination called for in claim 2, wherein the inlet passage is smaller than the plug passage and the plug passage is smaller than the outlet passage.

6. The combination called for in claim 3, wherein the inlet passage is smaller than the plug passage and the plug passage is smaller than the outlet passage.

References Cited in the file of this patent

UNITED STATES PATENTS

| | | |
|---|---|---|
| 1,261,469 | Backe | Apr. 2, 1918 |
| 2,497,448 | Grosboll | Feb. 14, 1950 |
| 2,621,013 | Mansfield | Dec. 9, 1952 |